United States Patent [19]
Devost

[11] 3,762,695

[45] Oct. 2, 1973

[54] SHOCK ABSORBER

[75] Inventor: Valmore F. Devost, Silver Spring, Md.

[73] Assignee: The United States of America as represented by the Secretary of the Navy, Washington, D.C.

[22] Filed: Jan. 19, 1972

[21] Appl. No.: 219,051

[52] U.S. Cl. ................................................ 267/34
[51] Int. Cl. ............................................ B60g 11/56
[58] Field of Search ...................... 267/34 V, 65 RV

[56] References Cited
UNITED STATES PATENTS
3,175,699   3/1965   Price et al. .......................... 267/34
2,155,521   4/1939   Zaverella ............................ 267/34

Primary Examiner—James B. Marbert
Attorney—R. S. Sciascia et al.

[57] ABSTRACT

A shock absorber for absorbing shocks incident to high velocity impact including a cylindrical housing having a tapered bore formed axially therein. A metering rod is slidably positioned longitudinally within the housing having end portions extending therebeyond with one of the end portions connectable to the movable object. An enlarged piston is formed on that portion of the metering rod which is contained within the housing bore. A high viscosity fluid medium, such as Duxseal, fills the chamber defined by the housing bore.

7 Claims, 1 Drawing Figure

PATENTED OCT 2 1973 3,762,695
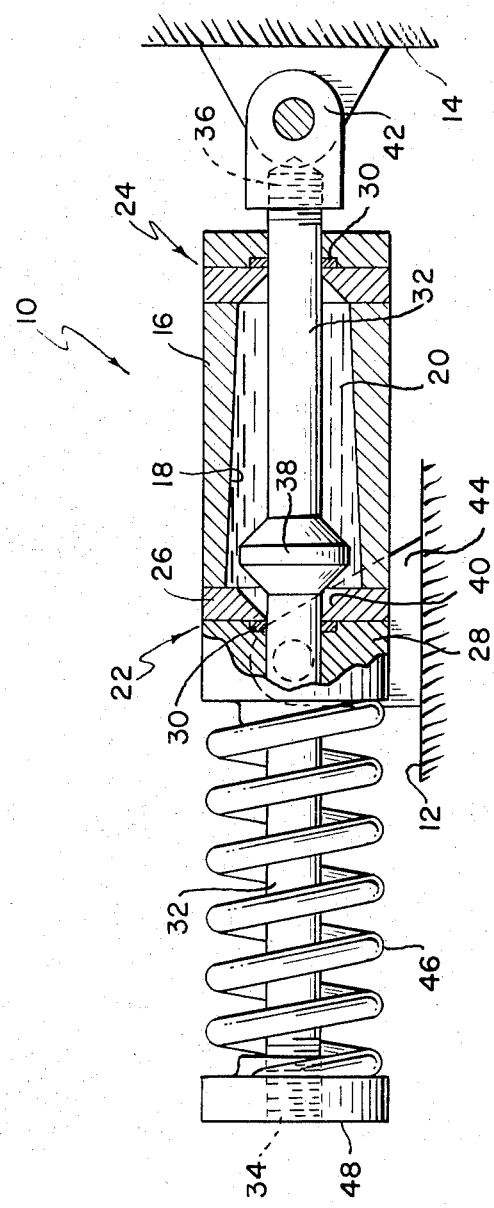

SHOCK ABSORBER

BACKGROUND OF THE INVENTION

This invention relates generally to a shock absorber, and more particularly to a shock absorber capable of absorbing the impact energy created during high velocity impact.

Various applications necessitate the use of devices which absorb relatively high shock loads. For example, in the coupling of rail cars to one another, a great deal of damage would result in the absence of the use of shock absorbing devices which dissipate the energy created. Another example of such use is in shock-test apparatus. In particular, in testing weapons for reaction to countermine measures or shocks incurred while the weapons are being carried on-board surface vessels and submarines, shock testers have been developed for imparting a similated shock environment.

Problems have arisen, however, while using prior art shock absorbing devices in the applications mentioned hereinabove. Most high energy shock absorbers are complex, precision devices that use low-viscosity fluids and intricate dashpot-orifice mechanisms to absorb impact energy. Because of this complex structure and, in addition, due to the intricate tolerances necessary for the operation of the devices, these prior art shock absorbers are costly and generally not readily available. Further, although shock absorbers are available which are capable of absorbing high energy, e.g., 240,000 inch-pounds, these absorbers are liminted to acting under impact of less than 20 feet per second. An absorber capable of absorbing a high energy impact at high velocities, e.g., 50 feet per second, is not readily available.

SUMMARY OF THE INVENTION

Accordingly, one object of this invention is to provide a new and improved shock absorber.

Another object of the invention is the provision of a new and improved shock absorber for absorbing high velocity impact shocks.

Still another object of the present invention is to provide a new and improved high velocity impact shock absorber which is rugged and simple in structure and economical to manufacture.

Briefly, in accordance with one embodiment of this invention, these and other objects are attained by providing a housing containing a relatively high viscosity fluid medium therein. A spring-biased rod having a piston formed thereon is slidably positioned within the housing. The housing is further provided with a bore having an appropriate configuration so as to provide a continuously decreasing orifice area as the rod moves within the housing. High velocity shock is absorbed since as the piston moves faster, more pressure is produced by the fluid medium and, further, the closing orifice provides increasing resistance to fluid flow and piston movement.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawing therein:

The FIGURE is a side view in partial section of the shock absorber according to the present invention.

DESCRIPTION OF THE PREFERRED EMBODIMENT

Referring now to the drawing, the shock absorber, generally denoted as 10, is shown as being connected to a fixed surface 12 which may be either a fixed foundation or heavy structural member. Likewise, the shock absorber is connected to the surface 14 of a member which will move at a high velocity and create a shock which the shock absorber is intended to absorb.

The shock absorber 10 includes a cylindrical housing 16 formed of any suitable material, such for example, as steel. The housing 16 is provided with a bore 18 which is slightly tapered, becoming smaller in diameter in the direction of the moving surface 14. A chamber 20 is defined within housing 16 by bore 18 and end cap assemblies 22 and 24 fastened onto each end of housing 16. Each end cap assembly includes a first disc 26 having a tapered opening formed centrally therein and a second disc 28 having a bore formed centrally therein and alignable with the central opening in first disc 26. Adjacent the central bore of second disc 28 is an annular groove for receiving a fluid seal 30 which may be made of any suitable material such as Teflon.

Extending longitudinally through housing 16 and end cap assemblies 22 and 24 is an elongate metering rod 32. The metering rod has end portions 34 and 36 which extend beyond the end cap assemblies 22 and 24 respectively with end portion 34 being substantially greater in length than end portion 36.

The mid-portion of metering rod 32 is enclosed within chamber 20 of housing 16 and has formed thereon an enlarged portion comprising a piston 38. The diameter of piston 38 is substantially equal to the smaller diameter of tapered bore 18 and is formed with front and back faces which oppose each other at angles of 45 degrees. Thus, it is seen that when piston 38 is positioned at that end of housing 16 where bore 18 is of large diameter as shown in the FIGURE, an annular orifice 40 is defined by the outside surface of piston 38 and the surface of bore 18. Should metering rod 32 be moved in the direction of decreasing bore diameter, the size of orifice 40, i.e., the cross-sectional area thereof, correspondingly decreases. The end diameters of the tapered bore 18, the diameter of piston 38 and other dimensions of shock absorber 10 are, of course, suitably selected to meet design requirements. As an example only, the ratio of the larger diameter of bore 18 to the diameter of piston 38 may be about 1.165:1.

The metering rod 32 is slidably positioned in housing 16 with sealing members 30 maintaining chamber 20 fluid-tight. The terminal portion of end portion 36 of the metering rod is threadedly fastened to surface 14 by means of an eye-clevis bracket 42 while the leading edge of housing 16 defined by second disc 28 of end assembly 22 is attached to fixed surface 12 by a trunnion type of attachment 44.

In the present embodiment, a coil spring 46 is preset against housing 16 by a cap 48 screwed onto the terminal end of end portion 34. This spring maintains piston 38 at the end of bore 18 as shown in the FIGURE.

Chamber 20 is filled with a relatively high viscosity fluid medium generally having a viscosity of 60 poises. In the preferred embodiment, the fluid medium employed was Duxseal, an asbestos based plastic sealing compound manufactured by Johns Manville Corporation. This filler material is both cheap and of a higher viscosity. The higher the viscosity of the fluid medium, the better the seal attains and less chance of leakage.

In operation, when an impact or an impulsive load is applied to the object represented by surface 14 in the direction shown in the FIGURE, the piston 38 enclosed within the tapered bore 18 compresses the fluid medium forcing it from one side of the piston to the other. The faster the piston moves, the greater the pressure that is produced. Further, as the piston travels along chamber 20, orifice 40 decreases in cross-sectional area thereby increasing resistance to motion in that direction. Thus, shock due to high velocity impacts are absorbed by the shock absorber.

Many advantages are inherent in the device described hereinabove. For example, the shock absorber of the present invention requires no complex orifice system or high quality seals. Because the device is simpler, its size overall is approximately one half that of currently available shock absorbers with equivalent energy absorbing ratings.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A shock absorber for absorbing shock resulting from high velocity impacts of a movable member comprising:

a cylindrical housing having a tapered bore formed axially therein;

a metering rod slidably positioned longitudinally within said housing having first and second end portions extending beyond said housing, said first end portion fastenable to said movable member; and an enlarged piston formed on a portion of said rod contained within said bore of said housing.

2. A shock absorber as recited in claim 1 wherein said cylindrical housing is provided with end caps covering the ends of said bore, said end caps including Teflon sealing means for providing fluid seals between said metering rod and said housing.

3. A shock absorber as recited in claim 2 wherein said bore is filled with a liquid medium having a relatively high viscosity of about 60 poises.

4. A shock absorber as recited in claim 3 wherein said high viscosity liquid medium is Duxseal.

5. A shock absorber as recited in claim 3 wherein said piston has a diameter equal to the diameter of said bore at said bore's smaller end and slightly smaller than said bore diameter at said bores larger end.

6. A shock absorber as recited in claim 5 wherein the ratio of bore diameter to piston diameter at the larger bore end is about 1.165:1.

7. A shock absorber as recited in claim 3 wherein said second metering rod end portion extends substantially beyond said housing and has a compression spring fitted thereover, said spring having one end urgingly biased against said housing by a retaining cap fixed to said second rod end portion.

* * * * *